United States Patent [19]

Azami

[11] Patent Number: 4,835,856
[45] Date of Patent: Jun. 6, 1989

[54] PISTON RING MANUFACTURING METHOD

[75] Inventor: Katsumasa Azami, Isesaki, Japan

[73] Assignee: Sanden Corporation, Gunma, Japan

[21] Appl. No.: 68,580

[22] Filed: Jul. 1, 1987

[30] Foreign Application Priority Data

Jul. 5, 1986 [JP] Japan .................................. 61-157199

[51] Int. Cl.⁴ .............................................. B23P 15/06
[52] U.S. Cl. ............................ 29/156.6; 29/156.5 R; 29/428; 72/352
[58] Field of Search .......... 29/156.5 R, 156.6, 156.61, 29/156.63, 428, 418; 277/215; 72/352

[56] References Cited

U.S. PATENT DOCUMENTS

| | | | |
|---|---|---|---|
| 1,803,309 | 4/1931 | Budlong | 29/156.63 |
| 1,815,354 | 7/1931 | Grant | 29/156.63 |
| 2,372,979 | 4/1945 | Phillips | 29/156.63 |
| 3,670,383 | 6/1972 | Gavrun | 29/156.61 |
| 3,698,054 | 10/1972 | Prasse | 29/156.63 |
| 3,758,929 | 9/1973 | Fabregat | 29/156.6 |

Primary Examiner—Timothy V. Eley
Assistant Examiner—Irene Cuda
Attorney, Agent, or Firm—Banner, Birch, McKie & Beckett

[57] ABSTRACT

A method for manufacturing a piston ring for use in a refrigerant compressor is disclosed. The method includes the steps of disposing the piston ring in an annular groove which is formed on one end surface of a fixed holder; and pressuring the piston ring in the groove by a lower end surface of a press until the lower end surface of the press contacts the upper end surface of the fixed holder. At least one projection formed on either the fixed holder or the press contacts the piston ring. A plurality of grooves are thereby formed on one end surface of the piston ring as the pressing operation progresses.

7 Claims, 3 Drawing Sheets

PISTON RING MANUFACTURING METHOD

TECHNICAL FIELD

The present invention relates to a method for manufacturing a piston ring. More particularly, the present invention relates to a method for manufacturing a piston ring with a plurality of grooves which is suitable for use in a wobble plate type compressor.

BACKGROUND OF THE INVENTION

In a compressor such as a wobble plate type compressor, lubrication for the driving mechanism in the crank chamber is generally supplied by blow-by gas which is mixed with lubricating oil in a mist state. Also, in a compressor which is provided with a variable capacity mechanism to change the compressor volume by changing the inclined angle of a cam rotor, it is necessary to control the pressure in the crank chamber to change the compressor volume. The crank chamber communicates with the suction chamber through a passageway, and communication therebetween is controlled by the opening and closing of a valve device. Therefore, the blow-by gas sometimes returns to the suction chamber through the passageway to control the pressure in the crank chamber.

As mentioned above, blow-by gas is very important for operating the compressor. Therefore, the amount of blow-by gas leaked into the crank chamber should be maintained at a stable level. Accordingly, a conventional piston ring fitted on an outer surface of a piston is provided with a plurality of grooves on its outer peripheral surface to communicate between the interior of the crank chamber and the inside of the piston cylinders to secure the amount of blow-by gas.

The grooves of the piston ring are generally formed by a cutting or turning tool. However, since a plurality of grooves should be formed on a single piston ring, manufacturing time increases and precision decreases.

SUMMARY OF THE INVENTION

It is a primary object of this invention to provide a method for manufacturing a piston ring with a plurality of grooves which is relatively simple to manufacture.

It is another object of this invention to provide a method for manufacturing a piston ring with a plurality of grooves which is formed precisely.

A method for manufacturing a piston ring with a plurality of grooves according to this invention includes the step of providing a pre-formed piston ring and disposing on it a transverse groove by pressing the piston ring between a press and a fixed holder. An annular groove is formed on an upper end surface of a fixed holder for holding the piston ring. The piston ring is pressed by a press until the lower end surface of the press contacts the upper surface of the fixed holder and a projection on either the press or the fixed holder forms a groove on the piston ring.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE DRAWINGS

FIG. 1b is a cross-sectional view taken along line A—A' in FIG. 1a.

FIG. 3b is a cross-sectional view taken along line A—A' in FIG. 3a.

FIG. 4b is a plan view of a fixed holder of the manufacturing tool associated with the press of FIG. 4a.

DETAILED DESCRIPTION OF PREFERRED EMBODIMENTS

Figure 1A:
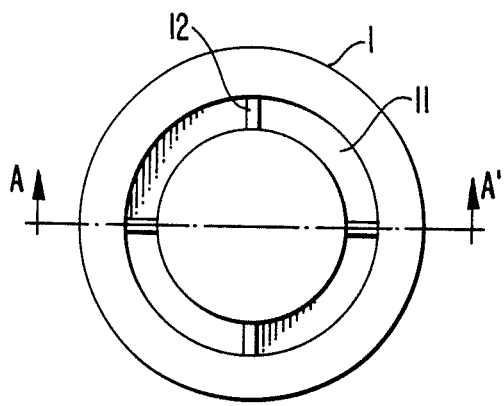
FIG. 1a is a plan view of a fixed holder of a manufacturing tool in accordance with one embodiment of this invention.
Figure 1B:
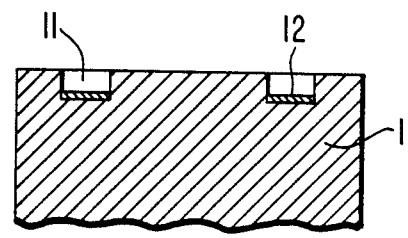
Figure 2:
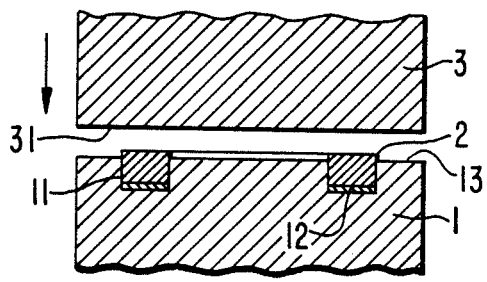
FIG. 2 is a cross-sectional view illustrating the manufacturing process for a piston ring including the fixed holder of FIG. 1.

With reference to FIGS. 1 and 2, a manufacturing tool includes a cylindrical fixed holder 1 and a press 3. Cylindrical fixed holder 1 is provided with an annular groove 11 on one end surface thereof to receive a pre-formed piston ring 2. Annular groove 11 is formed so that the width of annular groove 11 is equal to that of piston ring 2, and the depth or height of annular groove 11 is equal to the thickness of piston ring 2. Annular groove 11 is provided with a plurality of projections 12 on its bottom surface. Projections 12 are formed so that their height is about one third of the depth of annular groove 11.

Figure 3A:
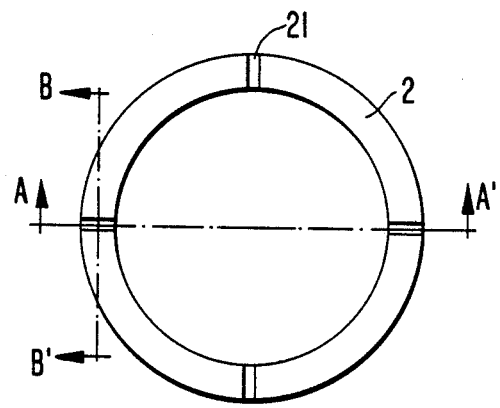
FIG. 3a is a plan view of a piston ring manufactured by the tool of FIG. 1.
Figure 3B:
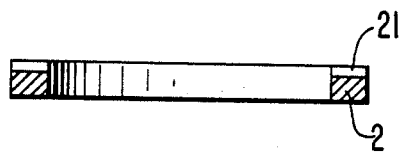

When manufacturing the piston ring, as shown in FIG. 2, piston ring 2 is disposed in annular groove 11. Piston ring 2 is fitted on the upper end surface of projections 12. Thus, piston ring 2 slightly projects from an uppper end surface 13 of fixed holder 1. Thereafter, piston ring 2 is pressed in the direction indicated by the arrow in FIG. 2 by press 3 which is provided with a plane surface 31 on one side for facing piston ring 2. This operation is continued until plane surface 31 contacts upper end surface 13 of fixed holder 1. Accordingly, a plurality of grooves 21, e.g. four grooves as shown in FIG. 3a, are formed at the positions corresponding to projections 12 on one transverse end surface of piston ring 2. In this manufacturing process, since piston ring 2 is disposed in annular groove 11 whose depth and width are equal to the thickness and width, respectively, of piston ring 2, the outer and inner diameter of piston ring 2 is not changed. Other than the forming of grooves 21, piston ring 2 undergoes no significant additional external deformation.

Figure 3C:
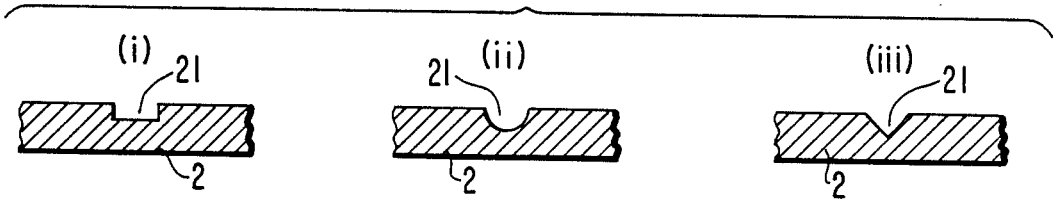
FIGS. 3c are cross-sectional views taken along line B—B' in FIG. 3a illustrating different cross-sectional shapes for the piston ring groove.

With reference to FIGS. 3a, b, and c, the shape of groove 21 formed on piston ring 2 is shown. Piston ring 2 is provided with four radially extending grooves 21. Grooves 21 are disposed on piston ring 2 at 90° intervals. The cross-sectional shape of grooves 21 can be changed in accordance with the cross-sectional shape of projections 12 of fixed holder 1, e.g., a rectangle as shown in FIG. 3c(i), a half circle as shown in FIG. 3c(ii) or a triangle as shown in FIG. 3c(iii).

Figure 4A:
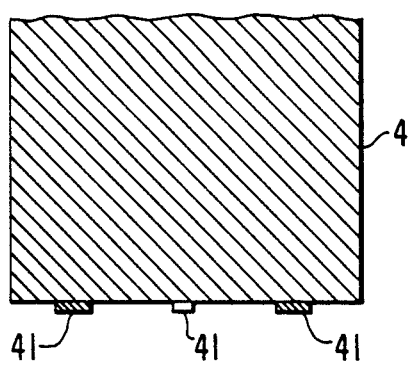
FIG. 4a is a cross-sectional view of a press of a manufacturing tool in accordance with another embodiment of this invention.
Figure 4B:
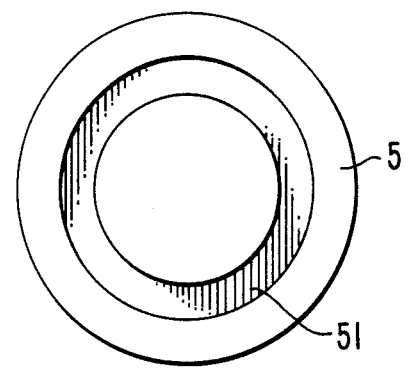

As shown in FIG. 4, in an alternate embodiment, the projections may be formed on the bottom surface of press 4. That is, as shown in FIG. 4a, cylindrical press 4 is provided with a plurality of projections 41 having a width equal to that of annular groove 51 of cylindrical fixed holder 5, shown in FIG. 4b. The annular groove thickness is less than its depth. Annular groove 51 receives piston ring 2. Annular groove 51 is formed so that the width of annular groove 51 is equal to that of piston ring 2, and the depth or height of annular groove 51 is equal to the thickness of piston ring 2.

Figure 4C:
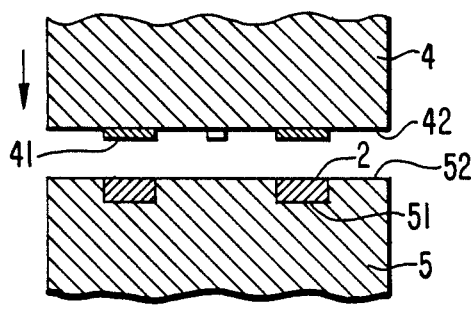
FIG. 4c is a cross-sectional view illustrating a manufacturing process for a piston ring using the tool of FIGS. 4a and 4b.

Referring to FIG. 4c, piston ring 2 is disposed on annular groove 51 of cylindrical fixed holder 5. Press 4 moves in the direction of the arrow, and grooves 21 are formed by projections 41 in accordance with the movement of press 4 until a plane surface 42 of press 4 contacts one end surface 52 of fixed holder 5. Accordingly, a plurality of grooves 21 are formed at the position corresponding to projections 41 on one end surface of piston ring 2.

Figure 5A:
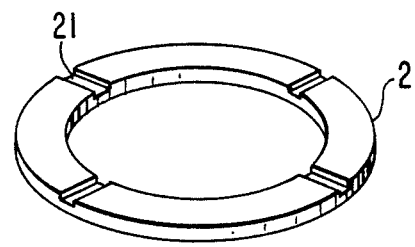
FIG. 5a is a perspective view of a piston ring which is manufactured by either the tool of FIG. 1 or FIG. 4.
Figure 5B:
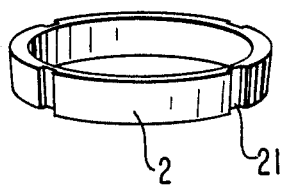
FIG. 5b is a perspective view of a piston ring in FIG. 5a after twisting.
Figure 5C:
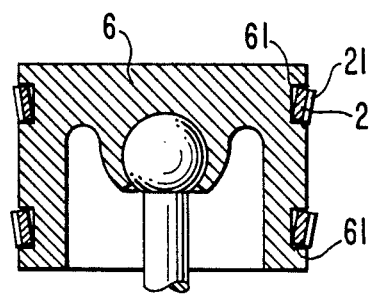
FIG. 5c is a cross-sectional view of a piston ring which is fitted on an outer surface of a piston.

Piston ring 2 is assembled on the piston described below. Piston ring 2 having grooves 21 is shown in FIG. 5a. Before piston ring 2 is disposed in outer grooves 61 of piston 6, piston ring 2 is twisted so that grooves 21 of piston ring 2 face outwardly as shown in FIG. 5b. Next, piston ring 2 is fitted in groove 61 through one end of piston 6 as shown in FIG. 5c.

Figure 6A:
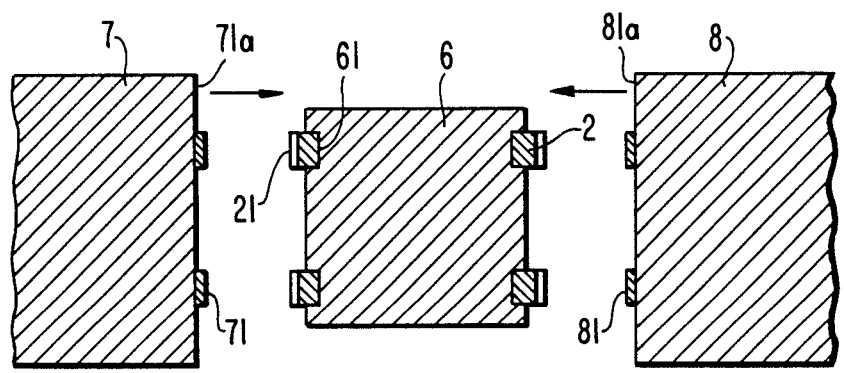
FIGS. 6(a) and 6(b) are illustrations of a manufacturing process for a piston ring in accordance with another embodiment of this invention.
Figure 6B:
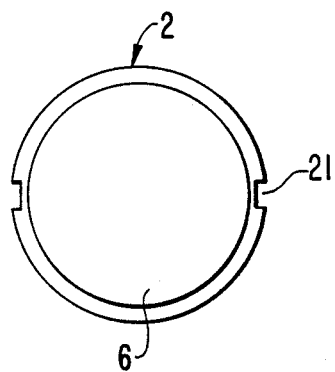

Referring to FIG. 5, 6(a) and 6(b), a manufacturing process for grooves 21 in accordance with still another embodiment of this invention is shown. First, two piston rings 2 are disposed on outer grooves 61 of piston 6, respectively. Each piston ring 2 is formed so that the width of piston ring 2 is equal to that of outer groove 61, and the thickness of piston ring 2 is greater than the depth of outer groove 61. Therefore, when piston ring 2 is disposed in outer groove 61, piston ring 2 radially projects from the outer surface of piston 6. Presses 7 and 8, provides with a plurality of projections 71 and 81, respectively, which are symmetrical to each other on end surfaces 71a and 81a, respectively, are positioned to face piston 6. Piston 6, having piston ring 2, is thus disposed between presses 7 and 8. Presses 7, 8 move in the direction of each respective arrow around piston 6, until end surfaces 71a and 81a of presses 7 and 8, respectively contact the outer surface of piston rings 2. Since projections 71, 81 are formed to face each of piston rings 2, grooves 21 of piston rings 2 are formed.

Numerous characteristics and advantages of the invention have been described in detail in the foregoing description with reference to the accompanying drawings. However, the disclosure is illustrative only and the invention is not limited to the precise illustrated embodiments. Various changes and modifications may be affected therein by one skilled in the art without departing from the scope or spirit of the invention.

I claim:

1. A method for manufacturing a piston ring with at least one groove transverse to said piston ring to permit passage of blow-by gas when said piston ring is installed on a piston, the method comprising the steps of:

securing a pre-formed piston ring on a fixed holder, said pre-formed piston ring having a substantially uniform shape with opposing top and bottom surfaces and inner and outer annular side surfaces;

pressing said pre-formed piston ring while secured on said fixed holder with a press to cause at least one projection extending perpendicular in the axial direction to the surface of said pre-formed piston ring being pressed to deform said pre-formed piston ring to form at least one groove on said pre-formed piston ring without otherwise significantly externally deforming said pre-formed piston ring, wherein after said pressing step said at least one groove is formed on one of said top and bottom surfaces;

removing said pre-formed piston ring from said fixed holder; and twisting said pre-formed piston ring so that said opposing top and bottom surfaces become inner and outer annular side surfaces and said at least one groove faces outwardly of said preformed piston ring.

2. The method according to claim 1 wherein said at least one projection is mounted on said pressing tool.

3. The method according to claim 1 wherein said at least one projection is mounted on said fixed holder.

4. The method according to claim 3 wherein said fixed holder has an annular groove on an end surface thereof with said at least one projection mounted on the bottom of said annular groove, the method comprising the further step of placing said pre-formed piston ring in said annular groove to secure said pre-formed piston ring.

5. The method according to claim 4 wherein the height of said annular groove is substantially equal to the thickness of said pre-formed piston ring and said at least one projection extends outward from the bottom of said annular groove a fraction of the height of said annular groove.

6. The method according to claim 5 wherein the size of said annular groove substantially corresponds to the size of said pre-formed piston ring except for said at least one projection, the method further comprising the step of compressing said pre-formed piston ring in the vicinity of said at least one projection during said pressing step by pressing said pre-formed piston ring while placed in said annular groove, thereby preventing significant external deformation of said pre-formed piston ring other than forming said at least one transverse groove.

7. A method according to claim 6 wherein said at least one projection comprises four projections, and four transverse grooves are formed on said pre-formed piston ring.

* * * * *